June 9, 1953 W. S. OLIWA 2,641,753

PHOTOELECTRIC KEYBOARD

Filed July 14, 1951 3 Sheets-Sheet 1

INVENTOR
WALTER S. OLIWA
BY William F. Glover
AGENT

June 9, 1953 W. S. OLIWA 2,641,753

PHOTOELECTRIC KEYBOARD

Filed July 14, 1951 3 Sheets-Sheet 2

INVENTOR
WALTER S. OLIWA
BY William P. Glover
AGENT

INVENTOR
WALTER S. OLIWA
BY William F. Glover
AGENT

Patented June 9, 1953

2,641,753

UNITED STATES PATENT OFFICE 2,641,753

PHOTOELECTRIC KEYBOARD

Walter S. Oliwa, Orange, N. J., assignor to Monroe Calculating Machine Company, Orange, N. J., a corporation of Delaware Application July 14, 1951, Serial No. 236,840

15 Claims. (Cl. 340—345)

This invention relates to a new and improved input coding unit for electronic computers and the like.

In some electronic computers, decimal numbers, whether they be indicative of amounts or computer orders, are represented in the so-called coded decimal system of notation. In this well known system each decimal digit is represented by one or a combination of four binary digits which have the values 1, 2, 4, and 8. One method of handling the coded decimal system of notation requires that the four binary digits (1, 2, 4, and 8) be represented by differential combinations of four pulses transmitted in timed sequence. Another method requires that the four binary digits be represented by single pulses on each of four parallel lines. The former system which is known as serial operation is the one to which the invention will be applied herein, although the same is also applicable to the four parallel line system or to any other system of notation.

Obviously, therefore, the entry of a coded decimal value into a computer through the medium of a keyboard requires that the depression of a decimal digit key effect the transmission of the appropriate ones of said timed pulses to a suitable storage device in the computer. Further, it is evident that a single depression of a key must effect the transmission of only one pulse or one combination of the four pulses, as the case may be.

Known keyboards adaptable to the job at hand have a common fault in that they effect the transmission of information to the machine by the closure, or opening, of mechanical contacts which are controlled by the keys. This opening and closing of contact gives rise to sparking and other objectionable phenomena which are apt to cause interference in the relatively delicate electronic portions of the computer. Also it is found that it is almost impossible for the human hand to release a depressed key without causing a momentary make and break action of the mechanical contacts associated therewith. This key or contact chatter has the same effect as depressing the key several times, and unless remedial action is taken, the digit represented by the key depression will be entered into the computer a plurality of times.

One object of the invention is the provision of a keyboard coding unit which does not include any mechanical contacts or other apparatus apt to effect sparking or other interference producing phenomena.

According to the invention the several keyboard keys have associated therewith masking slides adapted to differentially interrupt one or more of a plurality of light beams which control the operation of a like number of phototubes, there being one beam and tube for each point of the code being handled. In the four point coded decimal code, four light beams are utilized. Depression of a key, therefore, will interrupt one or more of said beams and cut off the associated phototubes. The outputs of the phototubes are applied to suitable amplifiers which condition coincidence gates that are also controlled by timing or clock pulses produced by a suitable pulse generator. The four gates are controlled by the timing pulses in such manner that they are operable sequentially on interruption of the light beams associated therewith. Preferably, the gates are provided with a common output to receive the pulses produced by the sequential operation thereof. Obviously, if desired, the light beam arrangement may be reversed, that is, the beams may normally be broken and may be established differentially.

A further object of the invention is the provision of means for positively preventing the transmission of more than one set of code pulses for each depression of a key and for preventing the transmission of any code pulses unless a digit key is fully depressed.

According to the invention two other light beams and photocells are provided, one beam which may be termed an upper beam and the second which may be termed a lower beam. The masking slides associated with the several digit keys are arranged each to interrupt the upper beam prior to, or in coincidence with, interruption of the appropriate ones of the aforementioned four beams, and to interrupt the lower beam subsequent to the interruption of said four beams. The photocell associated with the upper beam is provided with an amplifier whose output is applied to a differentiating circuit adapted to set a trigger pair to one of its two stable conditions. In a like arrangement associated with the lower beam, the photocell is adapted to reset the trigger pair. The trigger pair is provided with an output which, when the pair is reset, operates an amplifier having a differentiator network in its output. The differentiated output of the amplifier is applied to the pulse generator and effects the production of four timing or clock pulses thereby. It is evident, therefore, that depression of a keyboard key first effects the setting of the trigger pair, or any other set-reset device such as a relay, then prepares the appropriate ones of the four coincidence gates for operation, and then resets the trigger pair to initiate an operation of the pulse generator, this latter operation operating the prepared gates.

It is to be noted that the trigger pair cannot initiate a further operation of the pulse generator until the depressed key has been fully restored and then depressed again to set and reset the trigger pair. The invention also contemplates the use of tape or cards for controlling the several phototubes in accordance with perforations therein or light modifying marks thereon, instead of the keyboard arrangement discussed above.

Other objects and features of the invention will become apparent from the following description when read in the light of the drawings of which:

Figure 1:
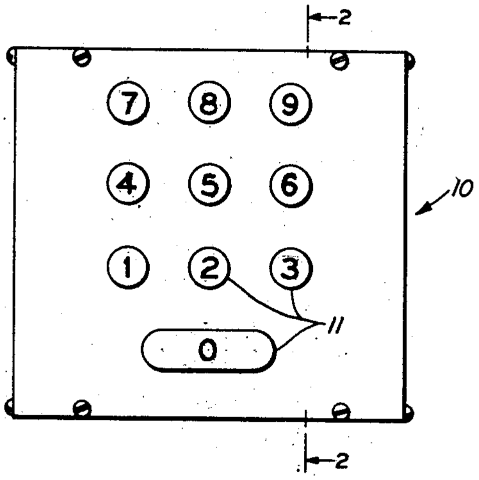
Fig. 1 is a plan view of a proposed mechanical embodiment of the keyboard coding unit of the invention.
Figure 2:
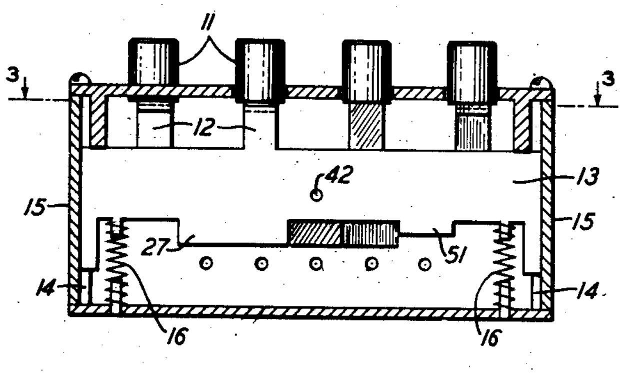
Fig. 2 is a sectional view on line 2—2 of Fig. 1.
Figure 3:
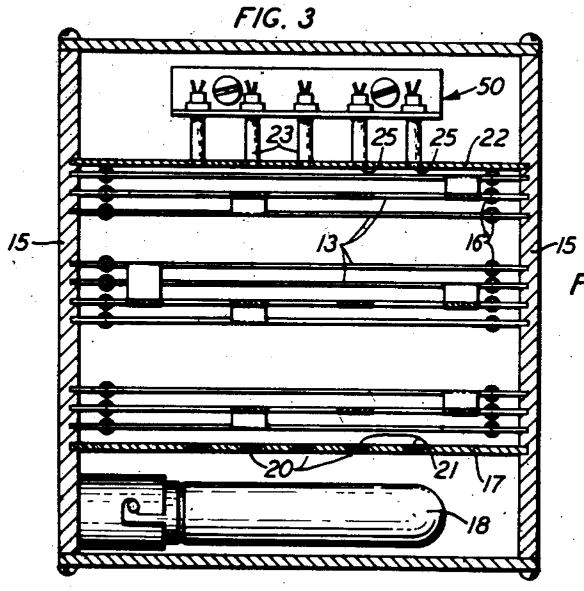
Fig. 3 is a sectional view on line 3—3 of Fig. 2.

Referring to Figs. 1–4, there is illustrated a proposed mechanical embodiment of the coding unit of the invention. As shown, the unit comprises a rigid casing 10 atop which digit keys 11 are arranged in the familiar ten key pattern. Each key 11 is fixed on an upwardly extending finger 12 of a masking slide 13 which is guided for vertical movements in grooves 14 in the front and rear walls 15 of casing 10 and which is tensioned upwardly by a pair of suitably arranged coiled springs 16. Within casing 10 but separated from the slides 13 by a front to rear, vertical partition 17 is a suitable source of illumination such as lamp 18. In order to utilize the illumination of lamp 18 to best advantage, four windows 20 in partition 17 are provided with lenses 21 which create four light beams extending beneath the slides 13 in a transverse direction. Preferably the four beams, which may be termed 1, 2, 4, and 8, are located in the same horizontal plane. A second front to rear, vertical partition 22 isolates four photocells 23 from the slides 13. The photocells 23 are in alignment, each with a lens 21, and each is provided with a small window 25 in partition 22 in order to eliminate or at least greatly diminish the amount of light which reaches each phototube from sources other than the associated beam 1, 2, 4 or 8.

It is evident, therefore, that normally the four beams 1, 2, 4 and 8 are focused by the lenses 21 on the photocells 23 and maintain the latter in conductive states.

Figure 4:
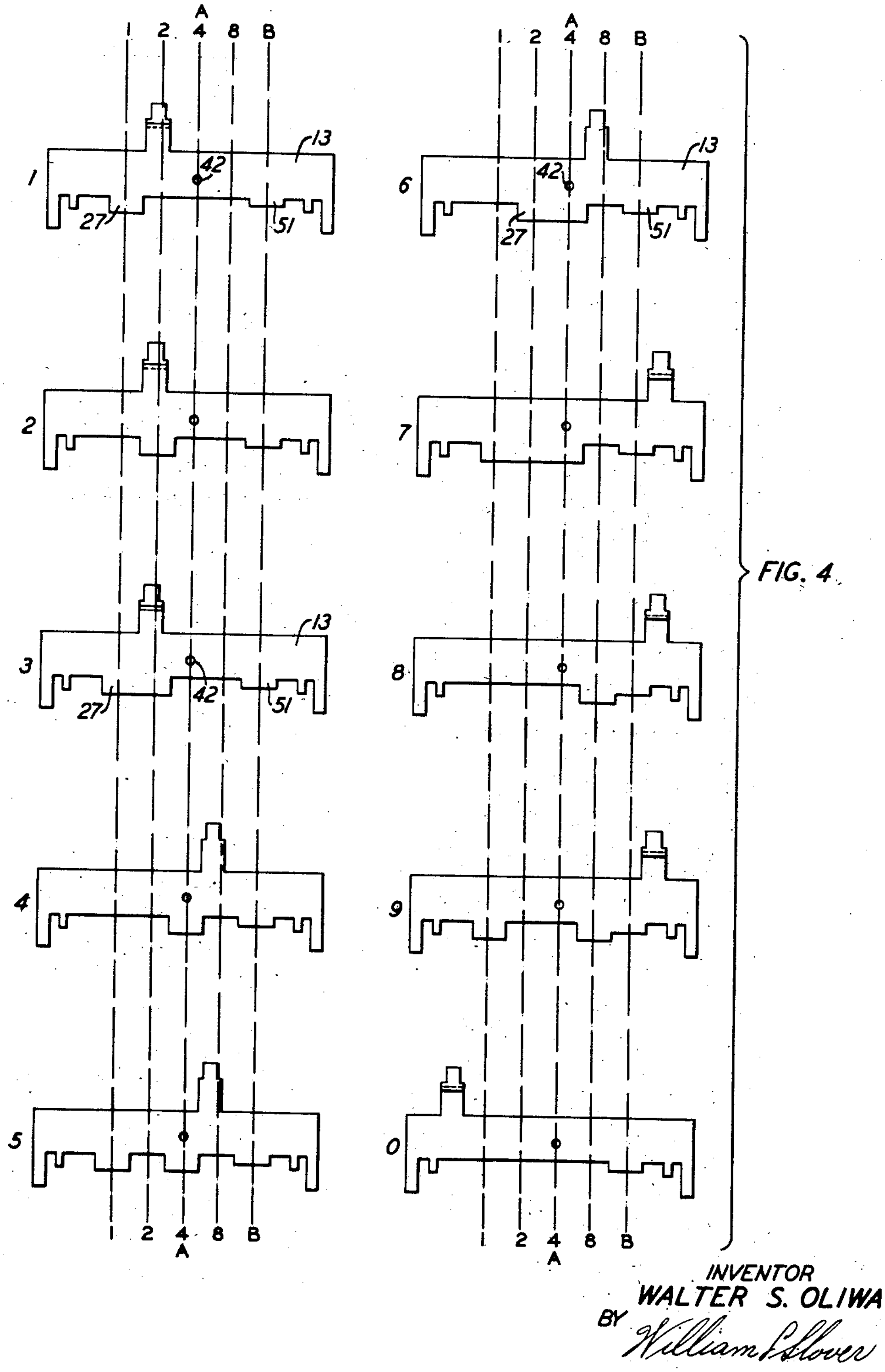
Fig. 4 is a diagrammatic representation of the several masking slides.

Referring particularly to Fig. 4, each slide 13 is provided on its under edge with one or more gags 27 which, when the slide is depressed by an operation of the associated key 11, interrupts the beam or beams 1, 2, 4 and 8 appropriate to that key. For example, the slide 13 associated with the "1" key 11 has a gag 27 which interrupts the 1 beam, the slide 13 associated with the "3" key 11 has a gag 27 adapted to interrupt both the 1 and the 2 beams, and the slide 13 associated with the "9" key 11 has one gag 27 to interrupt the 1 beam and another gag 27 to interrupt the 8 beam.

It is believed evident, therefore, that depression of any key 11 will interrupt the light beams 1, 2, 4 and 8 which are appropriate to the digit represented by that key.

At this point it is to be mentioned that the means for interrupting the light beams, or for allowing the beams to fall on their photocells if they are normally interrupted, may be of any suitable sort, the slides 13 and the associated mechanism being shown merely by way of example.

Figure 5:
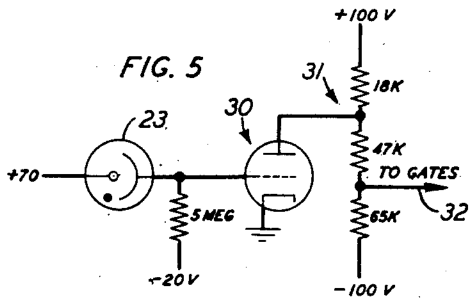
Fig. 5 is a circuit diagram illustrating the arrangement of each of the phototubes associated with the coding light beams.
Figure 6:
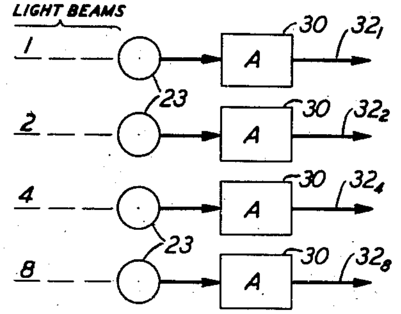
Fig. 6 is a diagrammatic view illustrating the four phototube circuits in broken form.
Figure 7:
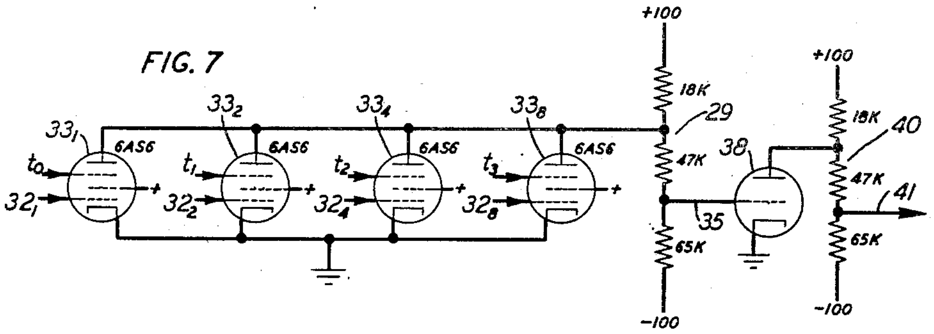
Fig. 7 is a circuit diagram illustrating the arrangement of the coincidence gate.

Referring now to Figs. 5, 6, and 7, each photocell 23 is preferably of the gaseous type and has its anode connected to a source of, say, +70 volt potential, and its cathode connected to the grid of an amplifier 30. Preferably, the grid of said amplifier is also connected through a large resistor, say, 5 megohms to a source of bias potential, say, −20 volts. Obviously, when phototube 23 is non-conductive, the bias voltage cuts off amplifier 30. When phototube 23 conducts, however, amplifier 30 is also made conductive. As here shown, and as presently to be described, only one amplifier 30 is provided for each phototube, but it is to be understood that, if desired, any number of amplifier stages may be used. The anode of amplifier 30 is connected to a three-section voltage divider 31 that is applied across a source of +100 and −100 potential. Preferably, divider 31 is made up of 65,000, 18,000 and 47,000 ohm sections as shown, and an output line 32 is connected to the center tap thereof. When amplifier 30 conducts, output line 32 assumes a potential of approximately −20 volts and when said amplifier is made non-conducting the output line assumes a potential of 0 volts. These resistor values and the values of the resultant potentials are given merely by way of example and may be modified to meet the individual user's requirements.

In Fig. 6 the photocell, amplifier arrangement for each of the four beams 1, 2, 4 and 8 is shown in block form and the outputs 32 thereof are provided with the appropriate subscripts 1, 2, 4 and 8 to facilitate an understanding of the invention.

The output lines $32_1$, $32_2$, $32_4$, and $32_8$ or their equivalents in a device handling some other code, may be utilized in a variety of ways in accordance with the individual requirements. For example, they may be used as the input lines to a computer, in which case, the potential fluctuations effected thereon by the amplifiers 30, control the operation of the computer. Or the said voltage fluctuations on said lines may control the operation of coincidence gates by a pulsing medium which is synchronized with the computer in order to properly time the parallel outputs of the gates. In the present instance, however, the following arrangement is provided.

The outputs $32_1$, $32_2$, $32_4$ and $32_8$ are applied to the control grids of four pentode coincident gates 33 which have their cathodes tied to ground and their anodes connected to a three-section voltage divider 29 which may be identical with the divider 31 described above. The screen grids of the four pentodes 33 are connected to a source of positive potential in the usual manner but the suppressor grids thereof are utilized as secondary control grids and are connected to pulse generating means which, on each depression of a key 11, applies a positively directed pulse to one of the four grids during each of four successive time periods that may be of any desired duration. As mentioned above, the lines $32_1$, $32_2$, $32_4$ and $32_8$ assume potentials of 0 and —20 volts, and for convenience the suppressor grid input potential may be assumed to be —20 volts except when pulsed, at which times the potentials thereof are raised to 0 volts. Obviously, when the control grid and the suppressor grid of one of the pentodes 33 are both at a potential of 0 volts, the tube conducts, causing current to flow in the voltage divider 29, and output line 35 of the latter drops in potential from 0 volts to —20 volts. When either grid of a pentode is at a potential of —20 volts, the tube is cut off regardless of the potential state of the other grid.

Figure 8:
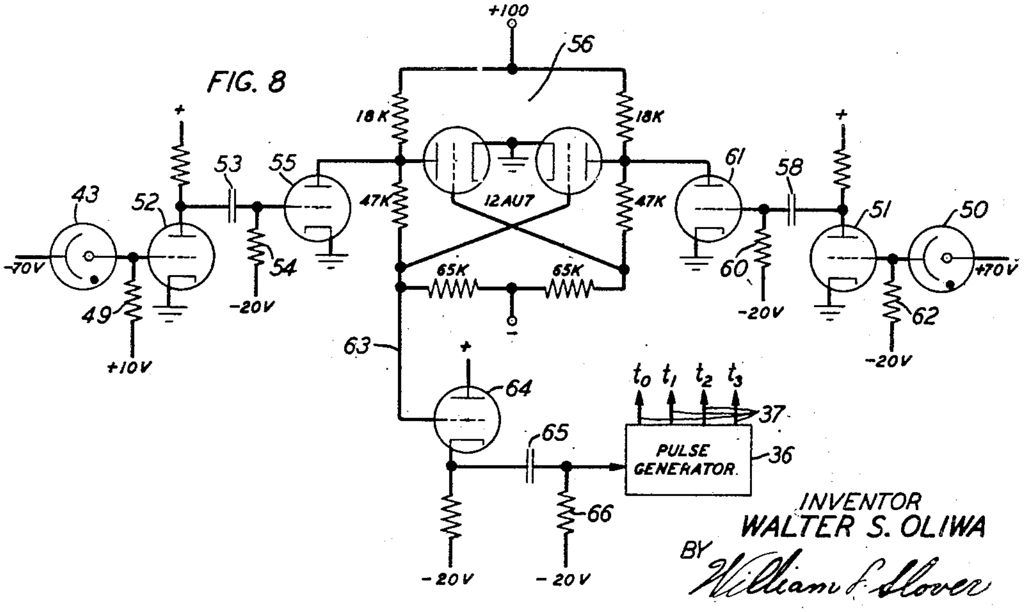
Fig. 8 is a circuit diagram illustrating the phototubes associated with the upper and lower control beams and the control apparatus operated thereby.

The means for applying positively directed pulses to the grids of the four pentodes may be of any suitable sort adapted to produce four successive pulses upon each actuation. The pulse generator 36, shown in block form in Fig. 8, has four output lines 37 which are normally at —20 volt potential, but which, on each actuation of the generator, are raised to 0 volt potential seriatim during four successive time periods which may be referred to as $t_0$, $t_1$, $t_2$ and $t_3$.

Preferably, output line 35 of voltage divider 29 is applied to the grid of an inverter triode 38 whose anode is connected to a voltage divider 40 having an output line 41 connected to its center tap. An operation of the device is as follows.

Depression of, say, the "9" key 11 interrupts the 1 and 8 light beams. This cuts off the phototubes 23 associated with said beams and the outputs $32_1$ and $32_8$ of the amplifiers 30 associated with said phototubes rise in potential from —20 volts to 0 volts. Thus 0 volt potentials are applied to the control grids of coincident gates $32_1$ and $32_8$. When, as will be described hereinafter, pulse generator 36 delivers its four pulses serially to the suppressor grids of gates 33, gate $33_1$ is made conducting during time period $t_0$ and the potential of output line 41 which may lead to the computer, is raised to 0 volt potential for the duration of the pulse from generator 36. During time periods $t_1$ and $t_2$, the suppressor grids of gates $33_3$ and $33_4$ are pulsed but ineffectually as the control grids thereof are at —20 volt potential. The control grid of gate $33_8$ is at 0 volt potential and when, during time period $t_3$, the suppressor grid is raised in potential to 0 volts, output line 41 is again raised to 0 volt potential. Obviously, therefore, pulses positively directed from —20 volts to 0 volts are transmitted over line 41 during time periods $t_0$ and $t_3$ to represent the digit "9" in the coded decimal (1, 2, 4, 8) system of notation.

In order to trigger generator 36 on each depression of a key 11 and also to prevent erroneous triggering thereof due to key chatter, the following means are provided. Each masking slide 13 is provided with an aperture 42 through which a beam A common to all the slides is normally projected from lamp 18 onto a phototube 43 that may be located above the tubes 23 described above (Figs. 2, 3 and 8). Depression of any key 11 immediately interrupts the beam A. As here shown, beam A is interrupted before the beams 1, 2, 4 and 8 but if desired, the interruptions may be coincident. In the same horizontal plane as the beams 1, 2, 4 and 8 there is provided a fifth beam B which is directed to a phototube 50 mounted in line with the tubes 23. Each masking slide 13 is provided with a gag 51 which is shorter than the gags 27 utilized to interrupt the beams 1, 2, 4 and 8 and which, therefore, interrupts beam B only after beam A and the appropriate one or ones of the beams 1, 2, 4 and 8 have been interrupted. Windows 20 and 25, and lenses 21 may be provided for the A and B beams the same as described above in connnection with beams 1, 2, 4 and 8.

The A and B beams are utilized to control the operation of any suitable set-reset device which normally prevents the voltage fluctuations effected by the coding amplifiers 30 from passing to the computer but which in the act of resetting allows of such passage. In a system such as that mentioned above wherein the outputs of the amplifiers are transmitted directly to the computer, the set-reset device may, for example, normally block amplifier outputs by means of a negative bias applied to the amplifier except during resetting operations. Preferably, however, the set-reset device comprises a stable trigger pair and is arranged to initiate an operation of the pulse generator 36 when reset. The preferred arrangement will now be described.

Phototube 43 for the A beam has its cathode connected to a source of, say, —70 volt potential and its anode applied to the grid of an amplifier triode 52. Said grid is also connected to a source of +10 volts potential through a resistor 53. The anode of amplifier 52 is applied to a differentiator network which includes a condenser 53 and a resistor 54 connected to a source of, say, —20 volt potential. This differentiator network is connected to the grid of an inverter or puller triode 55 whose output is utilized to set a stable trigger pair 56 which may be arranged in standard manner.

Assuming for the moment that beam A has been broken and is re-established, photocell 43 which was cut off when the beam was interrupted becomes conductive and cuts off amplifier 52. Differentiator network 53, 54, therefore, applies a sharp pulse to puller tube 55 and the latter is made conductive. The drop in potential at the anode of puller 55 sets trigger 56, that is, makes the left hand tube thereof conducting.

Phototube 50 which is associated with the B beam is connected through an amplifier 51, a differentiator network 58, 60 and a puller tube 61 to the opposite or resetting input of the trigger pair. The circuitry associated with tube 50 is substantially identical with that described above in connection with tube 43 and need not be re-described except to state that the anode of tube 50 is connected to a source of +70 volt potential and the cathode thereof is connected to the grid of amplifier 57, said grid also being connected through a resistor 62 to a source of, say, —20 volt potential.

Assuming for the moment that a key is depressed and beam B is interrupted, phototube 50 is cut off and as a result amplifier 57 also becomes non-conductive. This, through the action of the differentiator network 58, 60, effects the delivery of a sharp pulse to the grid of puller tube 61 and the latter conducts, resetting the trigger pair, that is, makes the right hand tube of the pair conductive.

The trigger pair 56 is provided with an output line 63 which, when the trigger is reset, is driven positive from −20 volts to 0 volts. Line 63 is connected to the grid of a cathode follower connected triode 64 having a differentiator network 65, 66 connected in the output from the cathode thereof. The resistor 66 of said network is connected to a source of −20 volt potential.

It is believed evident that when the output line 63 of the trigger is driven positively to 0 volts, the potential of the cathode of triode 64 rises also and differentiator network 65, 66 produces a sharp pulse. Preferably this sharp pulse is applied to the pulse generator 36 to trigger the latter. If desired, the sharp pulse output of differentiator 65, 66 or a special output line of generator 36 may also be utilized to advance a counter which indicates the number of digits that have been entered, and/or to prepare the computer to accept the digit which is to be transmitted thereto on operation of the pulse generator.

The circuitry associated with the A and B beams enlarges the described operation of producing a pulse representation of the digit "9" on output line 41 as follows.

Depression of the "9" key 11 first interrupts the A beam. This produces no useful result, however, as when the last key to be depressed was restored, the A beam was re-established and the trigger set as described above. Following this, the appropriate ones of the four beams 1, 2, 4 and 8 are interrupted and the gates 33 conditioned accordingly. Finally, the B beam is interrupted and the trigger is reset. This, as just above described, produces a sharp pulse which initiates an operation of pulse generator 36 and the said gates 33 are made conductive in the proper sequence to produce the desired pulses on output line 41.

It is to be noted that pulse generator 36 cannot be re-triggered until such time as the "9" key has been fully restored to re-establish the A beam and set the trigger, and then fully depressed again to reset the trigger. Obviously this eliminates the problem of key chatter.

Figure 9:
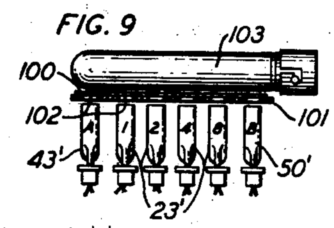
Fig. 9 is a fragmentary vertical sectional view illustrating the means of the invention as used with code tape or cards and Fig. 10 is a fragmentary plan view of the tape shown in Fig. 9.
Figure 10:
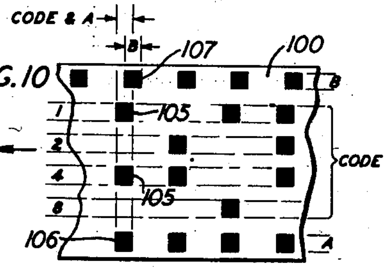

The means of the invention are also ideally adapted for use with computers or the like wherein the input information is in the form of code markings or holes in punched cards or tape. Referring to Figs. 9 and 10, there is illustrated, more or less diagrammatically, an arrangement whereby an information tape controls the operation of a plurality of photocells in the same manner and with the same result as the keyboard shutter 13 described above. As shown, tape 100 is fed by any suitable means across a bed plate 101. Aligned transversely to the direction of movement of the tape and below the bed plate 101 are six photocells of which the four indicated by the reference character 23′ are utilized for code purposes the same as described above; the one indicated by the reference numeral 43′ is utilized for the A beam as described above, and the one indicated by the reference numeral 50′ is utilized for the B beam also as described above. Directly above each of the photocells 23, 43′ and 50′ there is located a narrow slit 102 in bed plate 101 through which light from a lamp 103 positioned above the tape may pass. If desired, tape 101 may be opaque and have suitable code and control holes therein, in which case, each photocell is made conductive only on the passage of a said hole into alignment with the opening 102 in bed plate 101 associated with said photocell. Preferably, however, tape 101 is transparent and is provided with opaque code and control markings to cut off the normally conducting photocells the same as described above in the keyboard control arrangement. The opaque markings may be of any suitable configuration and in the present instance tape 101 is of sufficient width to accommodate, in a transverse line thereof, a combination of four code marks 105 having the values 1, 2, 4 and 8, an A mark 106 which may be aligned therewith and a B mark 107 which lags the code mark slightly. Of course, the use of other codes requires that more or less space be provided for code marks.

It is also to be noted that the code unit of the invention is adapted for rapid, accurate and interference free key controlled entry of information into a computer or the like.

It is believed evident, therefore, that each line of the tape contains not only an item of information which appropriately controls the photocells 23′, but also includes control markings to affect the A and B photocells 43′ and 50′ respectively. Further, the fact that the control marking 107 for the B phototube 50′ lags the control marking 106 and the code markings (that is, reaches its sensing opening 102 later as the tape is fed across the bed plate) effects cut off of its phototube subsequently to the cut off of any of the code tubes 23′ or the A control tube 43′. The operation of the photocells 23′, 43′ and 50′, therefore, is exactly the same as described above in connection with the keyboard form of the invention with the possible exception that code marking 106 moves out of registry with its sensing opening 102 prior to marking 107 and as a result the A photocell 43′ becomes conductive before the B phototube 50′. This change, however, has no effect on the operation of the device.

Associated with the phototubes 23′, 43′ and 50′, and controlled thereby in the same manner as described above, are the circuits shown in Figs. 5, 6, 7 and 8 or the modifications thereof mentioned above. In view of the fact that these circuits work in exactly the same way as previously described, it is not deemed necessary to redescribe them now.

While there has been above described a limited number of embodiments of the invention, it is to be understood that many modifications and changes can be made therein without departing from the spirit of the invention, and therefore, it is not desired to limit the scope of the invention except as set forth in the appended claims or as dictated by the prior art.

I claim:

1. A keyboard coding unit comprising means to create a plurality of light beams, a phototube controlled by each beam, key operated means for selectively affecting the control by certain of said beams on their phototubes, and for affecting the control by a pair of said beams on their phototubes, one beam of said pair being affected subsequent to all others, an amplifier associated with each phototube, a series of coincidence gates having a common output and each prepared for operation by the amplifier associated with one of said certain beams, pulse generating means for pulsing the gates seriatim, the prepared gates being operated thereby, a stable trigger pair set by the amplifier associated with the first affected beam of said pair and reset by the amplifier associated with the subsequently operated beam of the pair, and means operated by the resetting action of the trigger pair to initiate an operation of said pulse generator.

2. A keyboard coding unit comprising means to create a plurality of coding light beams and a pair of control light beams, a phototube controlled by each beam, key operated means for affecting said coding beams selectively and for affecting said pair of control beams, one subsequent to all other affected beams, an amplifier associated with each phototube, a series of coincidence gates having a common output and each conditioned for operation by an amplifier associated with a coding beam, pulse generating means for pulsing said gates seriatim to operate the conditioned ones thereof, a trigger pair set by the amplifier associated with the first affected control beam and reset by the amplifier associated with the subsequently affected control beam, and means actuated by the resetting action of the trigger pair to initiate an operation of said pulse generator.

3. In a keyboard coding unit, the combination of means for producing a plurality of light beams, one for each point of the code being handled and a control pair, a phototube controlled by each beam, key operated means for affecting the control of the beams on their phototubes, the code beams selectively, and one of said control beams subsequent to all other beams, an amplifier associated with each phototube, a series of coincidence gates each prepared for operation by an amplifier associated with a code beam, normally dormant pulse generating means for pulsing said gates seriatim to operate the prepared ones thereof, a trigger pair set by the amplifier associated with the first affected control beam and reset by the amplifier associated with the subsequently affected control beam, and means actuated by the resetting action of the trigger pair to initiate an operation of said pulse generator.

4. In a keyboard coding unit, the combination of means for producing a plurality of light beams, one for each point of the code being handled and a control pair, a photo-tube controlled by each beam, key operated means for affecting the control of the beams on their phototubes, the code beams selectively, and one of said control beams subsequent to all other beams, an amplifier associated with each phototube, a series of coincidence gates each prepared for operation by an amplifier associated with a code beam, normally dormant pulse generating means for pulsing said gates seriatim to operate the prepared ones thereof, set and reset means reset by the amplifier for the subsequently affected control beam and set by the other control beam, and means operated by the resetting action of the last said means to initiate an operation of the pulse generator.

5. In a keyboard coding unit, the combination of means for producing a plurality of light beams, one for each point of the code being handled and a control pair, a phototube controlled by each beam, key operated means for affecting the control of the beams on their phototubes, the code beams selectively, and one of said control beams subsequent to all other beams, an amplifier associated with each phototube, a series of coincidence gates having a common output and each prepared for operation by an amplifier associated with a code beam, normally dormant pulse generating means for pulsing said gates seriatim to operate the prepared ones thereof, set and reset means reset by the amplifier for the subsequently affected control beam and set by the other control beam, and means operated by the resetting action of the last said means to initiate an operation of the pulse generator.

6. In a keyboard coding unit, the combination of means for producing a plurality of light beams, one for each point of the code being handled and a control pair, a phototube controlled by each beam, key operated means for affecting the control of the beams on their phototubes, the code beams selectively, and one of said control beams subsequent to all other beams, a series of coincidence gates each controlled in part by a code beam phototube, a normally dormant pulse generator for pulsing the gates to operate those appropriately controlled by their phototubes, and means for initiating an operation of said pulse generator, prepared for operation by the first affected control beam phototube and operated by the action of the subsequently affected control beam phototube.

7. In a keyboard coding unit, the combination of means for producing a plurality of light beams, one for each point of the code being handled and a control pair, a phototube controlled by each beam, key operated means for affecting the control of the beams on their phototubes, the code beams selectively, and one of said control beams subsequent to all other beams, a series of coincidence gates having a common output and each controlled in part by a code beam phototube, a normally dormant pulse generator for pulsing the gates seriatim to operate those appropriately controlled by their phototubes, and means for initiating an operation of said generator, prepared for operation by the first affected phototube and operated by the action of the subsequently affected phototube.

8. In a keyboard coding unit, the combination of means for producing a plurality of light beams, one for each point of the code being handled and a control pair, a phototube controlled by each beam, key operated means for affecting the control of the beams on their phototubes, the code beams selectively, and one of said control beams subsequent to all other beams, an amplifier associated with each phototube, a series of coincidence gates each prepared for operation by an amplifier associated with a code beam, normally dormant pulse generating means for pulsing said gates seriatim to operate the prepared ones thereof, a trigger pair set by the amplifier associated with the first affected control beam and reset by the amplifier associated with the subsequently affected control beam, and means actuated by the resetting action of the trigger pair to initiate an operation of said pulse generator, the last said means including a cathode follower connected to the appropriate output of the trigger pair, and a differentiating network for producing a sharp initiating pulse.

9. In a coding unit for a data handling machine, the combination of means for producing a plurality of light beams, one for each point of the code being handled and a control pair, a phototube controlled by each beam, machine input means for affecting the control of the beams on their phototubes, the code beams selectively, and one of said control beams subsequent to all other beams, an amplifier associated with each phototube, a series of coincidence gates each prepared for operation by an amplifier associated with a code beam, normally dormant pulse generating means for pulsing said gates seriatim to operate the prepared ones thereof, set-reset means set by the amplifier associated with the first affected control beam and reset by the amplifier associated with the subsequently affected control beam, and means actuated by the resetting action of the set-reset means to initiate an operation of said pulse generator.

10. In a coding unit for a data handling machine, the combination of means for producing a plurality of light beams, one for each point of the code being handled and a control pair, a phototube controlled by each beam, machine input means for affecting the control of the beams on their phototubes, the code beams selectively, and one of said control beams subsequent to all other beams, an amplifier associated with each phototube, a series of coincidence gates having a common output and each prepared for operation by an amplifier associated with a code beam, normally dormant pulse generating means for pulsing said gates seriatim to operate the prepared ones thereof, a trigger pair set by the amplifier associated with the first affected control beam and reset by the amplifier associated with the subsequently affected control beam, and means actuated by the resetting action of the trigger pair to initiate an operation of said pulse generator.

11. In a record controlled coding unit the combination of means for producing a plurality of light beams, one for each point of the code being handled and a control pair, a phototube controlled by each beam, the control of the beams on their phototubes being affected by said control record, the code beams selectively, and one of said control beams subsequent to all other beams, an amplifier associated with each phototube, a series of coincidence gates each prepared for operation by an amplifier associated with a code beam, normally dormant pulse generating means for pulsing said gates to operate the prepared ones thereof, a trigger pair reset by the amplifier for the subsequently affected control beam and set by the other control beam, and means operated by the resetting action of the trigger pair to initiate an operation of the pulse generator.

12. In a coding unit for a data handling machine, the combination of means for producing a plurality of light beams, one for each point of the code being handled, and a control pair, a phototube controlled by each beam, machine input means for affecting the control of the beams on their phototubes, the code beams selectively, and one of said control beams subsequent to all other beams, a series of coincidence gates each controlled in part by a code beam phototube, a normally dormant pulse generator for pulsing the gates to operate those appropriately controlled by their phototubes, and means for initiating an operation of said pulse generator, prepared for operation by the first affected control beam phototube and operated by the action of the subsequently affected control beam phototube.

13. In a coding unit for a data handling machine, the combination of means for producing a plurality of light beams, one for each point of the code being handled and a control pair, a phototube controlled by each beam, machine input means for affecting the control of the beams on their phototubes, the code beams selectively, and one of said control beams subsequent to all other beams, an amplifier associated with each phototube, a series of coincidence gates having a common output and each prepared for operation by an amplifier associated with a code beam, normally dormant pulse generating means for pulsing said gates seriatim to operate the prepared ones thereof, a trigger pair set by the amplifier associated with the first affected control beam and reset by the amplifier associated with the subsequently affected control beam, and means actuated by the resetting action of the trigger pair to initiate an operation of said pulse generator, the last said means including a cathode follower connected to the appropriate output of the trigger pair, and a differentiating network for producing a sharp initiating pulse.

14. In a record controlled coding unit the combination of means for producing a plurality of light beams, one for each point of the code being handled and a control pair, a phototube controlled by each beam, the control of the beams on their phototubes being affected by said control record, the code beams selectively, and one of said control beams subsequent to all other beams, an amplifier associated with each phototube, a series of coincidence gates each prepared for operation by an amplifier associated with a code beam, normally dormant pulse generating means for pulsing said gates to operate the prepared ones thereof, set-reset means set by the amplifier associated with the first affected control beam and reset by the amplifier associated with the subsequently affected control beam, and means actuated by the resetting action of the set-reset means to initiate an operation of said pulse generator.

15. In a record controlled coding unit the combination of means for producing a plurality of light beams, one for each point of the code being handled and a control pair, a phototube controlled by each beam, the control of the beams on the phototubes being affected by said control record, the code beams selectively, and one of said control beams subsequent to all other beams, an amplifier associated with each phototube, a series of coincidence gates each prepared for operation by an amplifier associated with a code beam, normally dormant pulse generating means for pulsing said gates to operate the prepared ones thereof, a trigger pair reset by the amplifier for the subsequently affected control beam and set by the other control beam, and means operated by the resetting action of the trigger pair to initiate an operation of the pulse generator, the last said means including a cathode follower connected to the appropriate output of the trigger pair, and a differentiating network for producing a sharp initiating pulse.

WALTER S. OLIWA.

References Cited in the file of this patent

UNITED STATES PATENTS

| Number | Name | Date |
|---|---|---|
| 2,327,369 | Potts | Aug. 24, 1943 |
| 2,382,251 | Parker et al. | Aug. 14, 1945 |
| 2,554,835 | Mallina | May 29, 1951 |

FOREIGN PATENTS

| Number | Country | Date |
|---|---|---|
| 613,084 | Great Britain | Nov. 22, 1948 |